United States Patent [19]
Graham

[11] Patent Number: 5,154,491
[45] Date of Patent: Oct. 13, 1992

[54] EMERGENCY AND PARKING BRAKE SYSTEM

[76] Inventor: John M. Graham, 930 Peninsula Ave., #205, San Mateo, Calif. 94401

[21] Appl. No.: 754,775

[22] Filed: Sep. 4, 1991

Related U.S. Application Data

[63] Continuation-in-part of Ser. No. 606,386, Oct. 31, 1990, which is a continuation-in-part of Ser. No. 497,932, Mar. 22, 1990, abandoned, which is a continuation-in-part of Ser. No. 430,755, Nov. 1, 1989, Pat. No. 4,973,107.

[51] Int. Cl.[5] ............................................. B60T 13/44
[52] U.S. Cl. ...................................... 303/6.01; 303/9; 303/9.76; 188/170
[58] Field of Search ........... 188/166, 168, 170, 153 R; 303/6.01, 9.76, 9, 79; 92/63, 64, 130 A, 130 R, 133, 130 C, 82

[56] References Cited

U.S. PATENT DOCUMENTS

| | | | |
|---|---|---|---|
| 3,302,530 | 2/1967 | Dobrikin et al. | 303/9 X |
| 3,431,031 | 3/1969 | Ike | 303/9 |
| 3,712,181 | 1/1973 | Swander, Jr. et al. | 188/170 X |
| 3,713,702 | 1/1973 | Campanini | 303/9 |
| 4,003,606 | 1/1977 | Plantan | 188/170 X |
| 4,121,873 | 10/1978 | Durling | 303/9 X |
| 4,593,954 | 6/1986 | Campanini | 303/9 X |
| 4,673,222 | 6/1987 | Knight | 303/9 |

Primary Examiner—Robert J. Oberleitner
Assistant Examiner—Peter M. Poon
Attorney, Agent, or Firm—Townsend and Townsend

[57] ABSTRACT

An emergency and parking (E&P) brake system (6) is used with a brake system (2) of the type including an air brake coupled to a service brake actuator (8) by a slack adjustor (104) movable between brake released and brake applied positions. The E&P system includes an E&P actuator (80), located physically distant from the brake actuator, which has a variable volume spring brake chamber (82), a spring brake chamber diaphragm assembly (84) movable between first and second positions, a variable volume spring deflection compensation chamber (86), and a movable compensation chamber diaphragm assembly 88. A compression spring (90) is positioned between the two diaphragm assemblies. The spring brake chamber diaphragm assembly is connected to the slack adjustor by a flexible cable (110). The spring brake chamber is normally maintained in its first position by pressurizing the spring brake chamber. Depressurizing both chambers applies a lower, parking brake force through the cable and slack adjustor. By simultaneously pressurizing the compensation chamber and depressurizing the spring brake chamber, the compensation chamber diaphragm assembly recompresses the spring to apply a higher, emergency braking force.

13 Claims, 15 Drawing Sheets

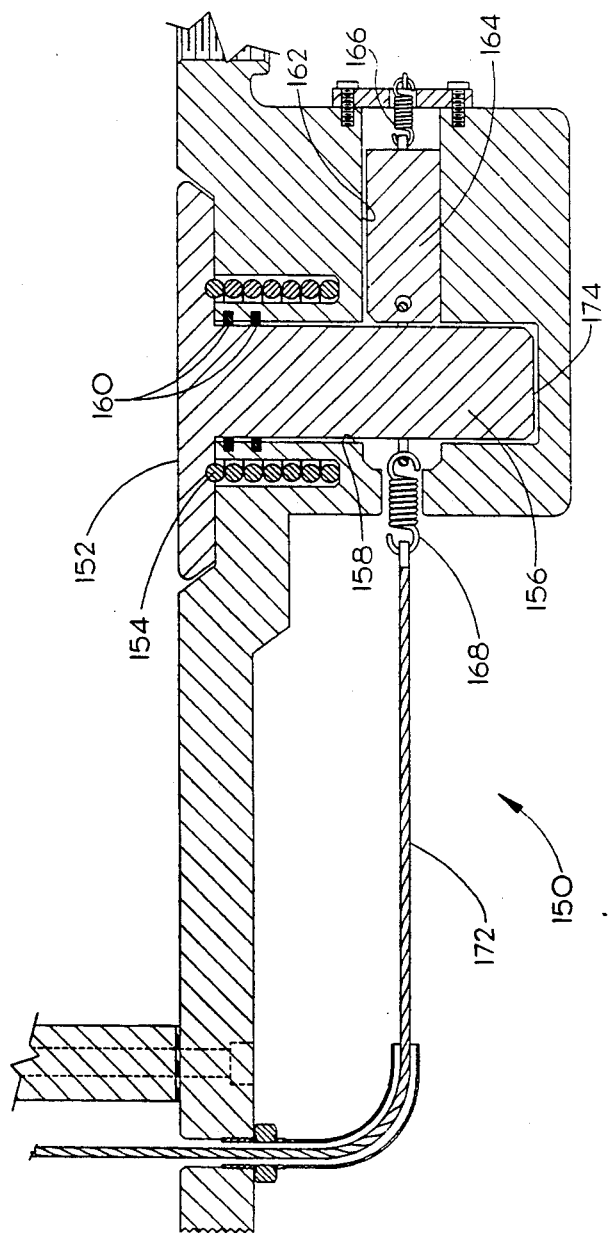
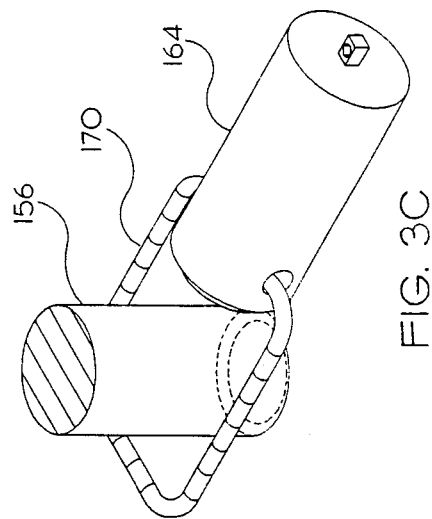
FIG. 3B
FIG. 3C

EMERGENCY AND PARKING BRAKE SYSTEM

CROSS REFERENCE TO RELATED APPLICATIONS

This is a continuation-in-part of U.S. patent application Ser. No. 07/606,386, filed Oct. 31, 1990 for AIR BRAKE SYSTEM WITH THREE CHAMBER BRAKE ACTUATOR; which is a continuation-in-part of U.S. patent application Ser. No. 07/497,932, filed Mar. 22, 1990, now abandoned, for DUAL PRESSURE AIR BRAKE SYSTEM WITH THREE CHAMBER BRAKE ACTUATOR; which is a continuation-in-part of U.S. patent application Ser. No. 07/430,755, filed Nov. 1, 1989, for DUAL PRESSURE AIR BRAKE SYSTEM, now U.S. Patent No. 4,973,107, the disclosures of which are incorporated by reference.

BACKGROUND OF THE INVENTION

Many large vehicles use air brake systems. These brake systems include air actuated service brakes coupled to service brake actuators. Pressurized air, typically at 100 psi, is applied to the service brake chambers of the service brake actuators to apply the service brakes. To keep the brakes applied when parked, combination brake actuators are usually used. A combination brake actuator includes a spring brake portion and a service brake portion. The spring and service brake portions include respective spring and service brake chambers, each defined in part by a piston or, more commonly, by a diaphragm assembly, connected to a push rod assembly. The push rod assembly is connected to the brake, typically by a slack adjuster. The spring brake portion also includes a heavy actuator spring, coupled to the push rod assembly, which tends to apply the brake. Supplying pressurized air to the service brake chamber applies the associated brake while supplying pressurized air to the spring brake chamber compresses the actuator spring to release the brake. Thus, when parked, air is exhausted from the service brake chamber which allows the actuator spring to apply the brake according to the force of the actuator spring.

One of the problems with conventional air brake systems is that the braking force generated by the spring brake portion of the combination brake actuator is only about 50% of the maximum braking force generated by an applied service brake. Therefore, with the spring brakes applied each axle with combination brake actuators has only about half the braking force which is available with the service brakes. One reason conventional combination brake actuators are so designed is to protect the brakes. That is, if the vehicle is parked and drum brakes are set while the drums are warm, upon cooling the drums have a tendency to contract which can, if the braking force is too high, result in damage to the brakes. Also, not all of the axles have combination brake actuators; due to economy and space requirements, often no more than half the axles are so equipped. Although the resulting braking force is sufficient for parking purposes, in an emergency, such as when service brake air pressure is lost, the braking force available is woefully inadequate.

Smaller automotive vehicles typically use hydraulic brake systems. Parking brakes with conventional hydraulic brake systems rely on a manual parking brake which is actuated by stepping on a pedal or pulling on a handle. The pedal or handle is connected to a cable which in turn pulls on a pair of cables ultimately connected to the rear brakes. While manually applied parking brakes ar generally adequate for most parking situations, they are quite limited in their ability to act as emergency brakes due to the low force exerted, the application of parking brakes to only the rear wheels and the lack of any sort of effective modulation of the braking force.

SUMMARY OF THE INVENTION

The invention is directed to a system which provides an emergency and parking (E&P) brake system in a manner which provides numerous advantages over existing systems.

The E&P brake system is used with a brake system of the type including a brake and a source of braking force, such as a compressed air tank, coupled to a brake actuator. The brake actuator includes a movable brake actuator element, typically called a slack adjustor, movable between brake released and brake applied positions. The E&P system includes an E&P actuator which is located a distance from the brake actuators, typically in the cab or at some other protected but relatively accessible position. The E&P actuator has a variable volume spring brake chamber which is defined in part by a spring brake chamber element, typically of a piston or diaphragm type, movable between first and second positions. The E&P actuator also includes a variable volume spring deflection compensation chamber defined in part by a movable compensation chamber element. A compression spring is positioned between the spring brake chamber element and the compensation chamber element.

The spring brake chamber element is connected to the brake actuator element, typically by a flexible cable. Thus, moving the spring brake chamber element from the first position to the second position applies a braking force to the brake actuator element. The spring brake chamber element is normally maintained in its first position by pressurizing the spring brake chamber. However, by depressurizing the spring brake chamber, such as during parking, the spring brake chamber element moves from the first position to the second position so to apply a parking brake force.

If one depressurizes the spring brake chamber while pressurizing the compensation chamber, the compensation chamber element moves against the spring thus recompressing the spring. This causes an increased emergency braking force to be applied to the brake actuator element by the spring over what would otherwise have been applied by the spring.

The E&P brake system uses an E&P actuator located physically separate from the one or more brake actuators it services. This permits the E&P actuator to be positioned in an area of the vehicle which is easier to get at for adjustment and maintenance than if the an E&P actuator were mounted directly to the service brake actuator. Many of the problems associated with repair and removal of spring brake actuators are avoided with the E&P brake system. The E&P actuator can be designed to be located on the vehicle at a position which is protected from the elements, such as water, snow and road salt. This accessibility allows the user to manually release the parking brakes in a convenient manner, as opposed to having to crawl under the vehicle, often under cold and wet conditions, to release conventional spring brakes. The system eliminates the need for the much heavier and expensive dual chamber brake actuators. The use of service brake actuators, in addition to freeing up space for the vehicle designer, also lessens the amount of support which is needed to support the brake actuator.

The invention is especially suited for retrofit applications. Since a single E&P actuator can be used with more than one brake actuator, weight and costs can be reduced when compared with conventional dual chamber brake actuators. More wheels can be provided with emergency and parking braking capability than are now so provided because of the efficiencies of the E&P brake system.

Conventional spring brakes can be taken apart and repaired only with special care; many accidents have been caused when special safety procedures have not been closely followed. The E&P actuator is preferably designed to be worked on safely. The user can manually release the brakes using the brake release wheel, uncouple the cables from the E&P actuator and then disassemble the E&P actuator. Preferably, the E&P actuator does not become fully disassembled until the spring is fully expanded so parts do not fly apart during disassembly.

Although parking brake force need not be modulated, emergency braking force is preferably modulated to be most effective. This can be accomplished with the E&P brake system.

Since the force exerted by the E&P actuator is completely independent of the force exerted by the service brake actuator, the force exerted by the E&P brake system can be much greater than that which could be exerted if one were limited according to the size of the service brake chamber. The E&P brake force need not be proportional to the service brake force because it is independent of it.

Other features and advantages will appear from the following description in which the preferred embodiment has been set forth in detail in conjunction with the accompanying drawings.

BRIEF DESCRIPTION OF THE DRAWINGS

FIG. 3B is an enlarged view of a portion of the E&P actuator of FIG. 3A illustrating the lock pin assembly;

FIG. 3C is an isometric view of a portion of the lock pin assembly of FIG. 3B;

DESCRIPTION OF THE PREFERRED EMBODIMENT

Figure 1:
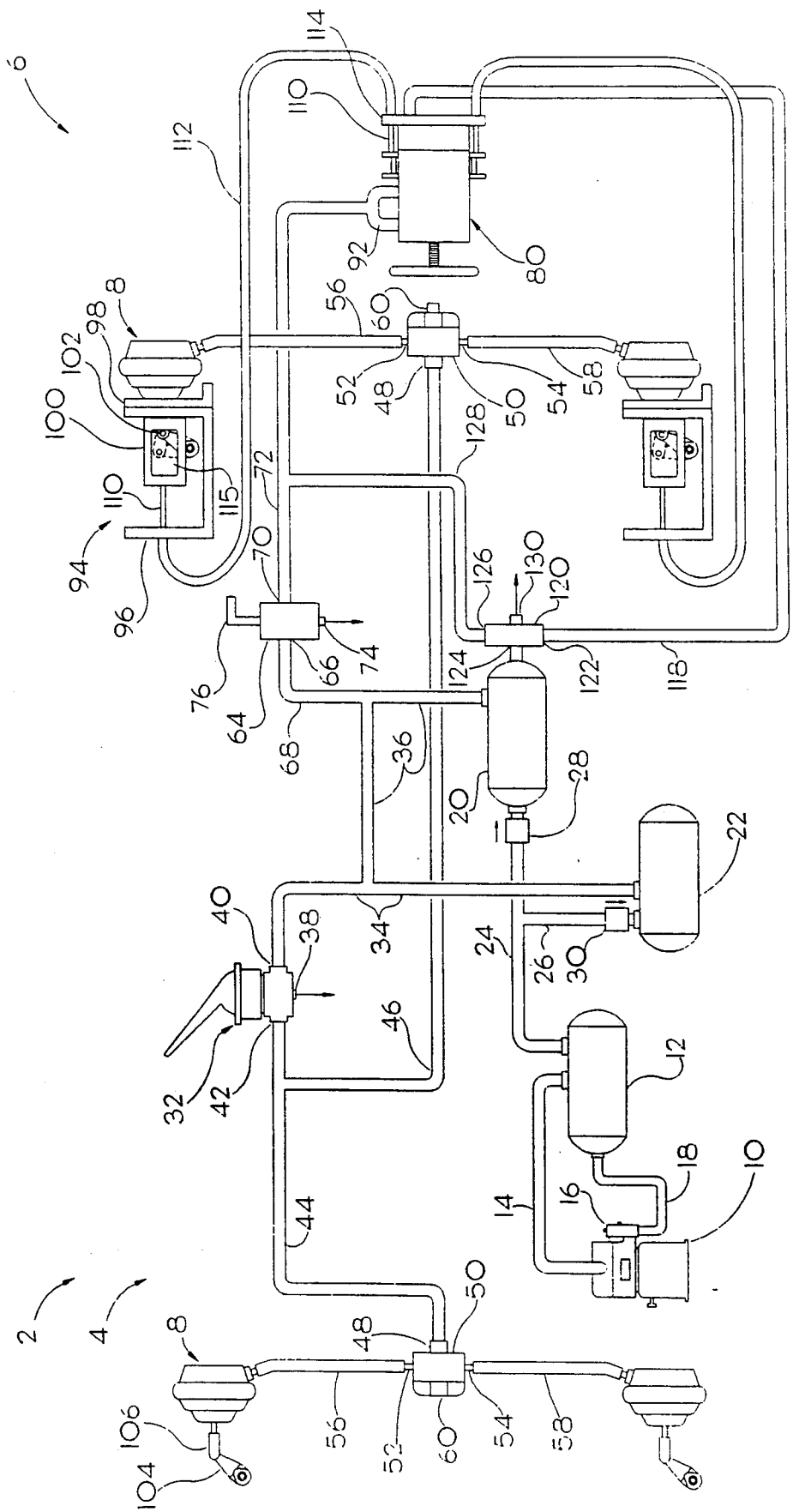
FIG. 1 is a simplified schematic view of an improved brake system made according to the invention with the E&P actuator shown in a deactivated state with the two spring brake chambers pressurized and the compensation chambers depressurized.

FIG. 1 shows an improved brake system 2 of the type including a generally conventional air brake system 4 with which an emergency and parking (E&P) brake system 6 is used. Air brake system 4 includes four service brake actuators 8, two each at the front and rear axles. Compressed air is supplied by a compressor 10 which feeds a supply or wet tank 12 with pressurized air along a line 14. Pressure within tank 12 is regulated by a governor 16 coupled to tank 12 through a line 18. Governor 16 maintains the pressure within wet tank 12 at about 100 psi.

Wet tank 12 supplies pressurized air to a pair of supply tanks 20, 22 through lines 24, 26 and check valves 28, 30. Pressurized air within supply tanks 20, 22 is directed to a service brake application valve (pedal valve) 32 through lines 34, 36. Valve 32 has an exhaust port 38, an inlet port 40 and an outlet port 42. Normally, that is with pedal valve 32 not depressed, outlet port 42 is coupled to exhaust port 38 so that lines 44, 46 are at atmosphere. Lines 44, 46 are coupled to the inlets 48 of quick release valves 50 at each axle. Quick release valves 50 each have outlet ports 52, 54 which are coupled to service brakes actuators 8 through lines 56, 58. Thus, when pedal valve 32 is activated or depressed, ports 40 and 42 are coupled to supply pressurized air to service brake actuators 8 through lines 44, 46, 56, 58. Deactuating pedal valve 32 couples ports 42 and 38, thus dropping the pressure at inlet 48 of each quick release valve 50 to atmosphere. This permits air within lines 56, 58 to exhaust through exhaust port 60 of each quick release valve 50, thus dropping the pressure within service brake actuator 8.

The above described structure is generally conventional. E&P parking brake system 6 will now be discussed. System 6 includes a modulated-type E&P brake control valve 64 having an inlet 66 coupled to line 36 by a line 68 and an outlet port 70 coupled to a line 72. Valve 64 also includes an exhaust port 74. Normally, valve 64 couples ports 70, 74 so that line 72 is exhausted to atmosphere. However, by manipulation of handle 76, valve 64 couples ports 66, 70 to permit line 72 to be pressurized. Valve 64 is preferably of a modulated type, as opposed to an on/off type, and is in common use in vehicle air brake systems in Europe.

Figure 3A:
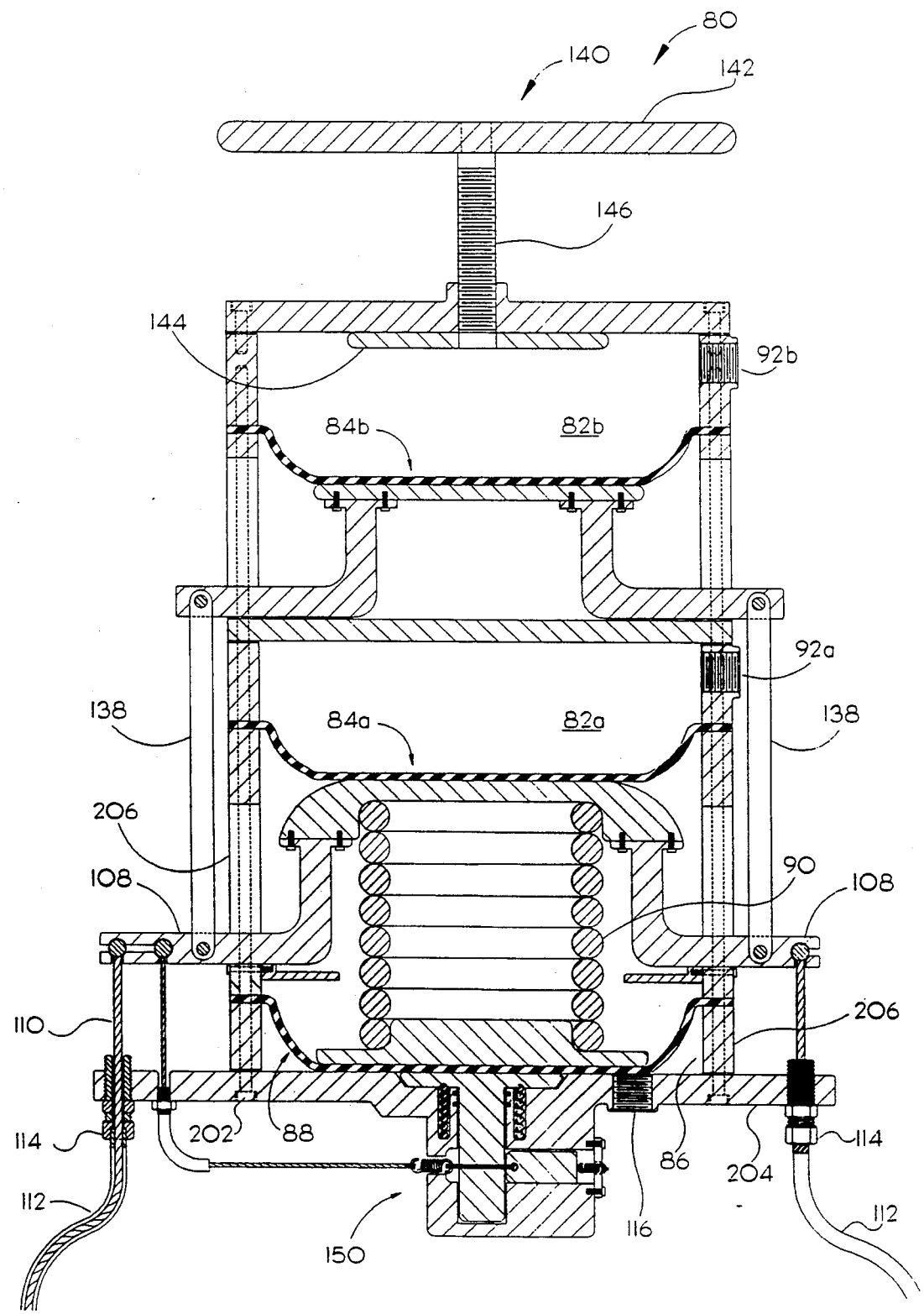
FIG. 3A is a side cross-sectional view of an alternative embodiment of the E&P actuator of FIG. 1 in a brakes released position.

E&P brake system 6 also includes an E&P actuator 80, see FIG. 3A, having a variable volume spring brake chambers 82a, 82b, defined in part by spring brake chamber diaphragm assemblies 84a, 84b, a variable volume spring deflection compensation chamber 86, defined in part by a movable compensation diaphragm assembly 88, and a stiff compression coil spring 90 captured between assemblies 84a, 84b and 88. Chambers 82a, 82b have ports 92a, 92b coupled to line 72 so that actuation of handle 76 pressurizes and depressurizes spring brake chambers 82a, 82b. When chambers 82a, 82b are pressurized and chamber 86 is depressurized (the pressurization and depressurization of chamber 86 being discussed below), E&P actuator 80 is in the position of FIG. 3A.

Figure 2A:
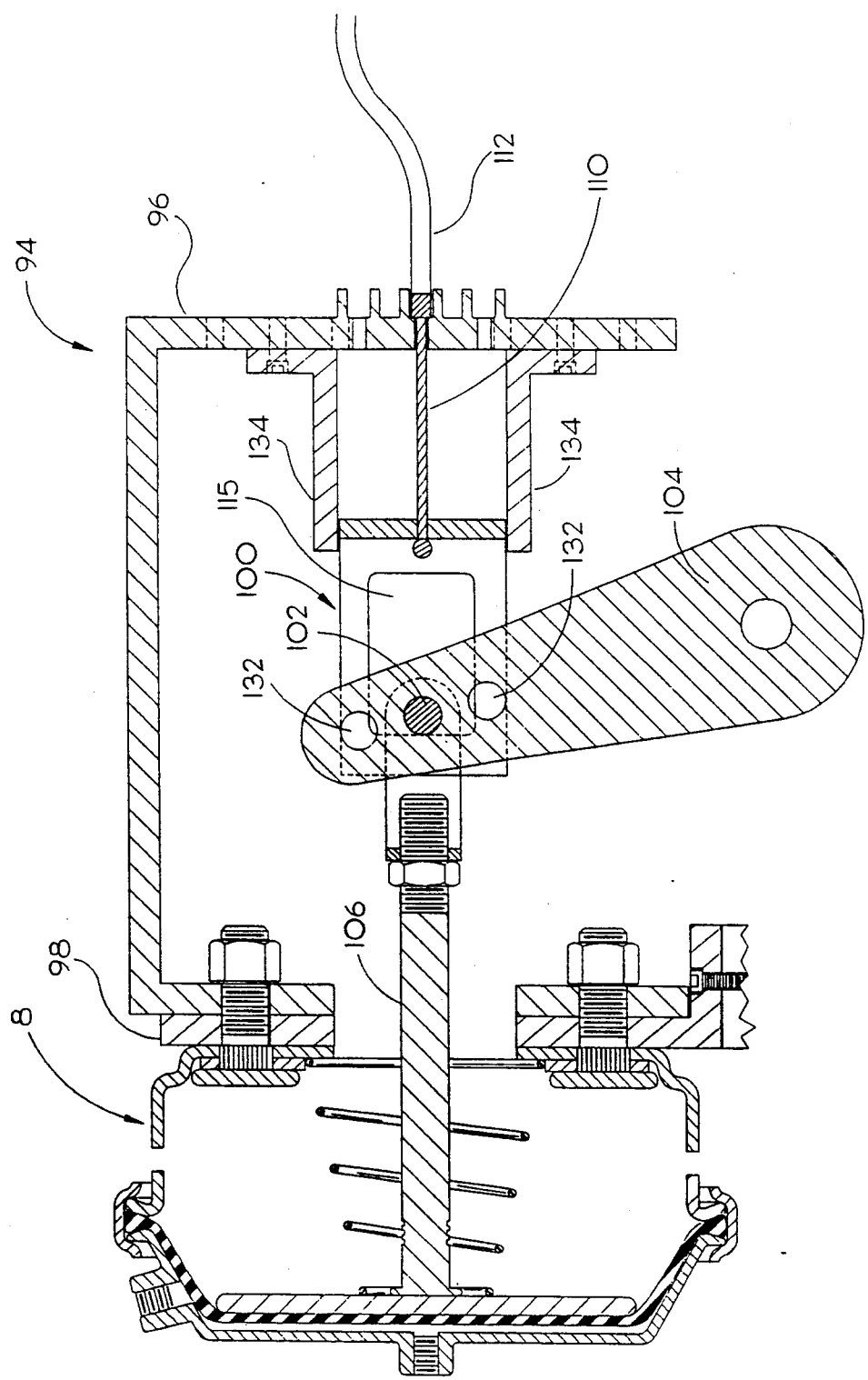
FIG. 2A is a side cross-sectional view of the brake force application assembly and service brake actuator of FIG. 1.
Figure 2B:
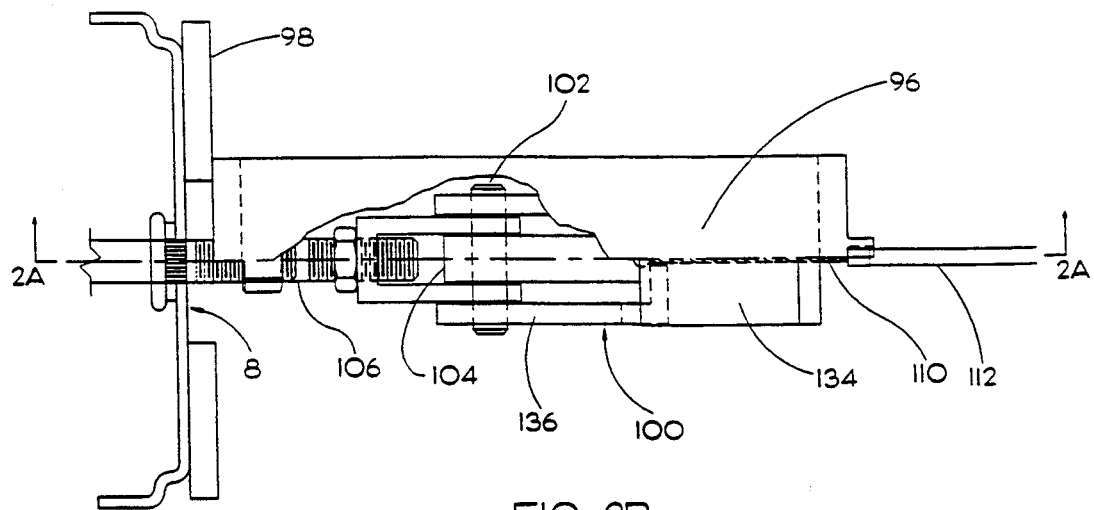
FIG. 2B is a top view of the brake force application assembly of FIG. 2A with portions broken away.
Figure 2C:
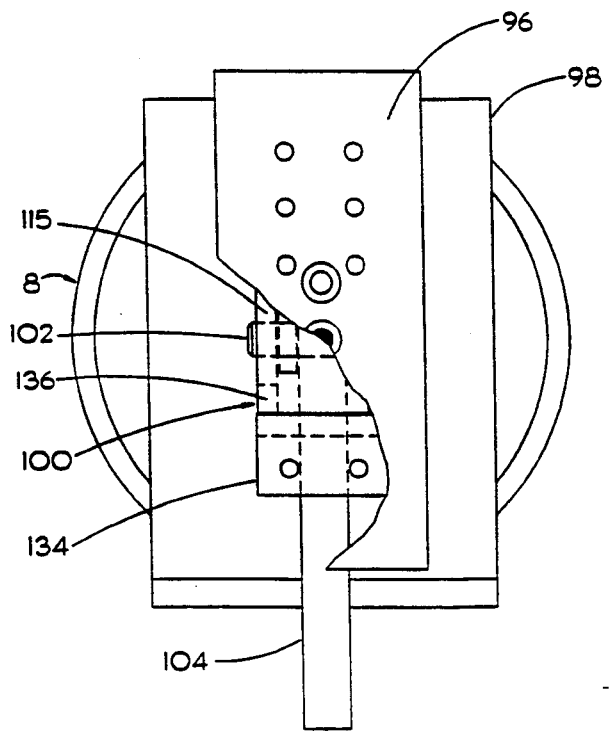
FIG. 2C is an end view of the brake force application assembly of FIG. 1 with the portions broken away.

System 6 also includes a brake force application assembly 94, see FIGS. 2A–2C, associated with the service brake actuators 8 at the rear axle. Each assembly 94 includes a frame 96 mounted to the same bracket 98 which supports service brake actuator 8 to the vehicle. Assembly 94 also includes a slotted yoke 100 which engages a pin 102 extending from the slack adjustor 104. Note that the slack adjustor 104 is of generally conventional construction and is used to couple push rod 106 to the brakes, not shown in FIG. 1. Yoke 100 is connected to an extension 108 of diaphragm assemblies 84a, 84b by a cable 110. Cable 110 is guided from frame 96 to E&P actuator 80 by a sheath 112. Sheath 112 terminates at a sheath keeper 114 mounted to actuator 80 at one end and by frame 96 at the other.

As mentioned above, pressurizing chambers 82a, 82b forces diaphragm assemblies 84a, 84b to the right in FIG. 1 (down in FIG. 3A), thus causing slotted yoke 100 to move to the right in FIG. 1 (to the left in FIG. 2A) and permit slack adjusters 104 to move freely between the solid line, brakes off position and the dashed line, brakes on position. Depressurizing line 72, either partially or totally, will permit spring 90 to bias diaphragm assemblies 84a, 84b to the left in FIG. 1 (up in FIG. 3A), thus moving yoke 100 to the left in FIG. 1 (to the right in FIG. 2A). However, yoke 100 must move a distance until slack adjuster 104 is in the brakes applied, dashed line position. Doing so can substantially reduce the amount of force exerted by the partially uncoiled spring 90 on spring brake diaphragm assemblies 84a, 84b and thus reduces the braking force exerted on the brakes by E&P brake system 6.

To compensate for this reduction in force due to the expansion of spring 90, system 6 supplies compensation chamber 86 with pressurized air through a port 116, a line 118, and a release exhaust valve 120. Release exhaust valve 120 has an outlet 122 connected to line 118, an inlet 124 connected to supply tank 20, a control port 126 connected to line 72 by a connecting line 128, and an exhaust port 130 coupled to the ambient environment. Release exhaust valve 120 is a conventional valve which fluidly couples inlet 124 and outlet 122 when the pressure at control port 126 is low. Release exhaust valve 120 fluidly couples outlet 122 to exhaust port 130, thus exhausting line 118 and compensation chamber 86 to atmosphere through exhaust port 130, when the pressure at control port 126 is high. In this way, when E&P brake system 6 is actuated, the normal deflection of spring 90 is eliminated or substantially reduced through the pressurization of chamber 86. This permits the greatly increased application of the supplemental braking force without increasing the size of virtually any of the components.

Brake force application assembly 94 is shown rather schematically in FIG. 1. As shown in FIG. 2A, slack adjuster 104 has a number of slack adjuster holes 132 which are normally used to couple slack adjuster to push rod 106 in a conventional manner. Yoke 100 is guided by guide plates 134 which are bolted to frame 96. Proper lateral positioning of yoke 100 is ensured by the passage of slack adjuster 104 between the two arms 136 of yoke 100. Pin 102 is shown passing through a centrally located hole 132 in FIGS. 2A and 2B but could be positioned in one of the other holes 132 as well by adjusting the positions at which guide plates 134 are bolted to frame 96.

E&P actuator 80 includes first and second variable volume spring brake chambers 82a, 82b combined in a series construction with spring brake chamber diaphragm assembly 84b connected to assembly 84a by rigid links 138. This design permits the axial compression force to be exerted against spring 90 to be increased without increasing the diameter of the unit. FIG. 3A illustrates the use of motorcycle-type cable adjusters as sheath keepers by which the user can adjust the effective lengths of cables 110. Also shown in FIG. 3A is a manual release assembly 140 including a manual release handwheel 142 connected to a manual release plate 144 by a threaded shaft 146. By turning wheel 142, which is preferably removably mounted to the end of shaft 146, plate 144 is driven towards spring brake diaphragm assembly 84b until the two touch. Doing so prevents spring 90 from pulling on cable 110. This is quite useful when the user needs to release the brakes for maintenance purposes. Since it is preferred that E&P actuator 80 be placed in a relatively accessible location, this allows the user to easily and quickly release the brake force which could otherwise be exerted by spring 90.

Figure 5:
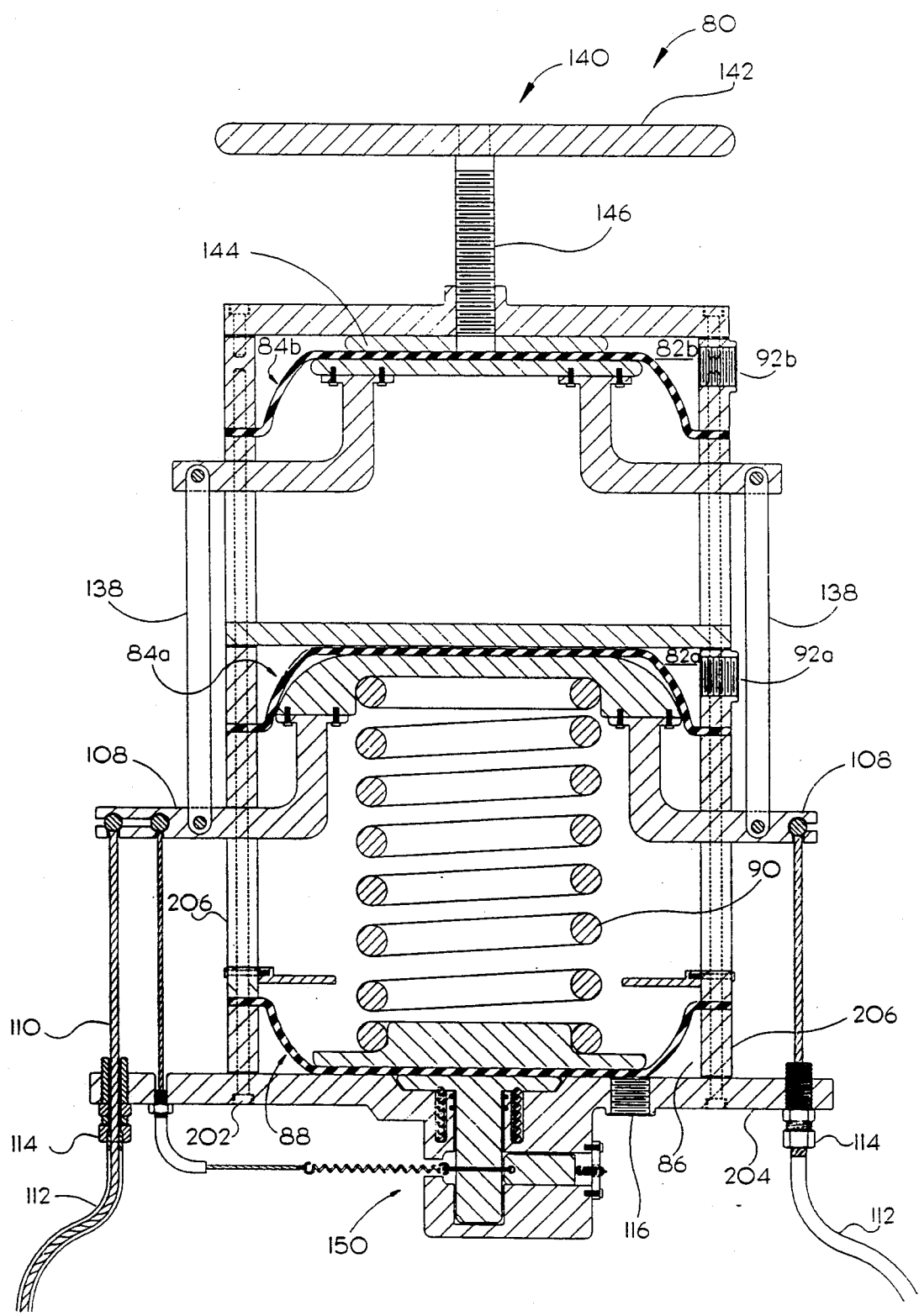
FIG. 5 illustrates the E&P actuator of FIG. 3A in a parking situation with the brakes partially applied through the depressurization of both the spring brake and compensation chambers using the system of FIG. 5.
Figure 6:
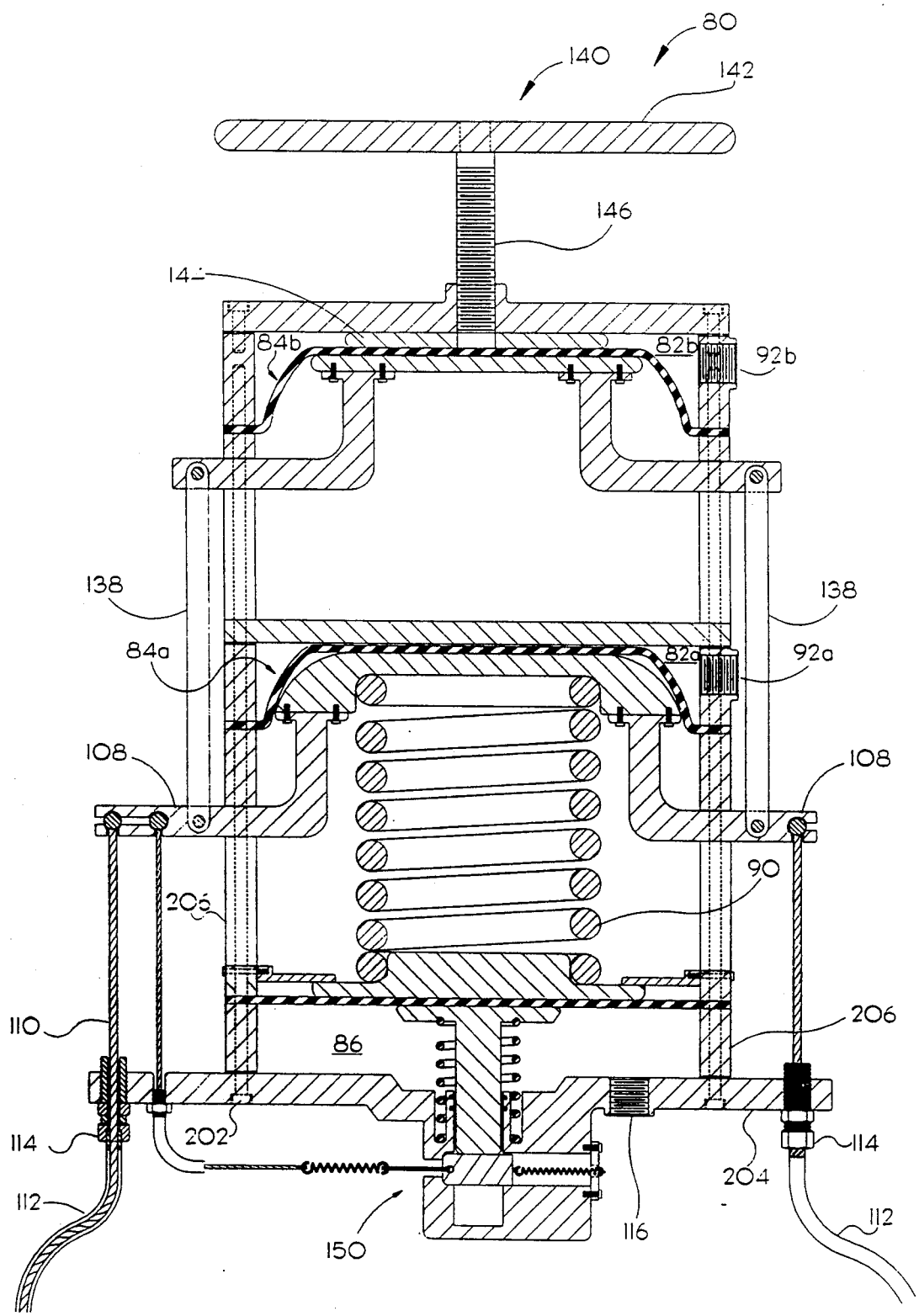
FIG. 6 shows the E&P actuator of FIG. 3A in an emergency situation with the brakes fully applied through the depressurization of the spring brake chamber and the pressurization of the compensation chamber.

E&P actuator 80 includes a lock pin assembly 150, shown in more detail in FIGS. 3B and 3C, used to keep compensation diaphragm assembly 88 in the position of FIG. 5. Assembly 150 includes a lock plate 152 positioned opposite diaphragm assembly 88. Lock plate 152 is lightly biased by a coil spring 154 towards diaphragm assembly 88. Lock plate 152 includes a central stem 156 housed within a bore 158; the stem is sealed within the bore by a pair of seals 160. A transverse bore 162 intersects bore 158 and has a slidable lock pin 164 mounted therein. Lock pin 164 is connected to a return spring 166 at one end and to an engaging spring 168 through a spring bail 170 at the other. As can be seen in FIG. 3C, spring bail 170 is U-shaped to bypass stem 156. Engaging spring 168 is connected to extension 108 through a cable 172. Thus, when chambers 82a, 82b, are vented to atmosphere and chamber 86 is pressurized, lock pin 164 is drawn to a position beneath the end 174 of stem 156 as shown in FIG. 6. Although not clear from FIG. 6, there is a small space between end 174 of stem 156 and lock pin 164. Thus, even if air pressure in chamber 86 were allowed to decrease, lock pin 164 would keep lock plate adjacent compensation diaphragm assembly 88 to maintain the force exerted on cable 110.

Figure 4:
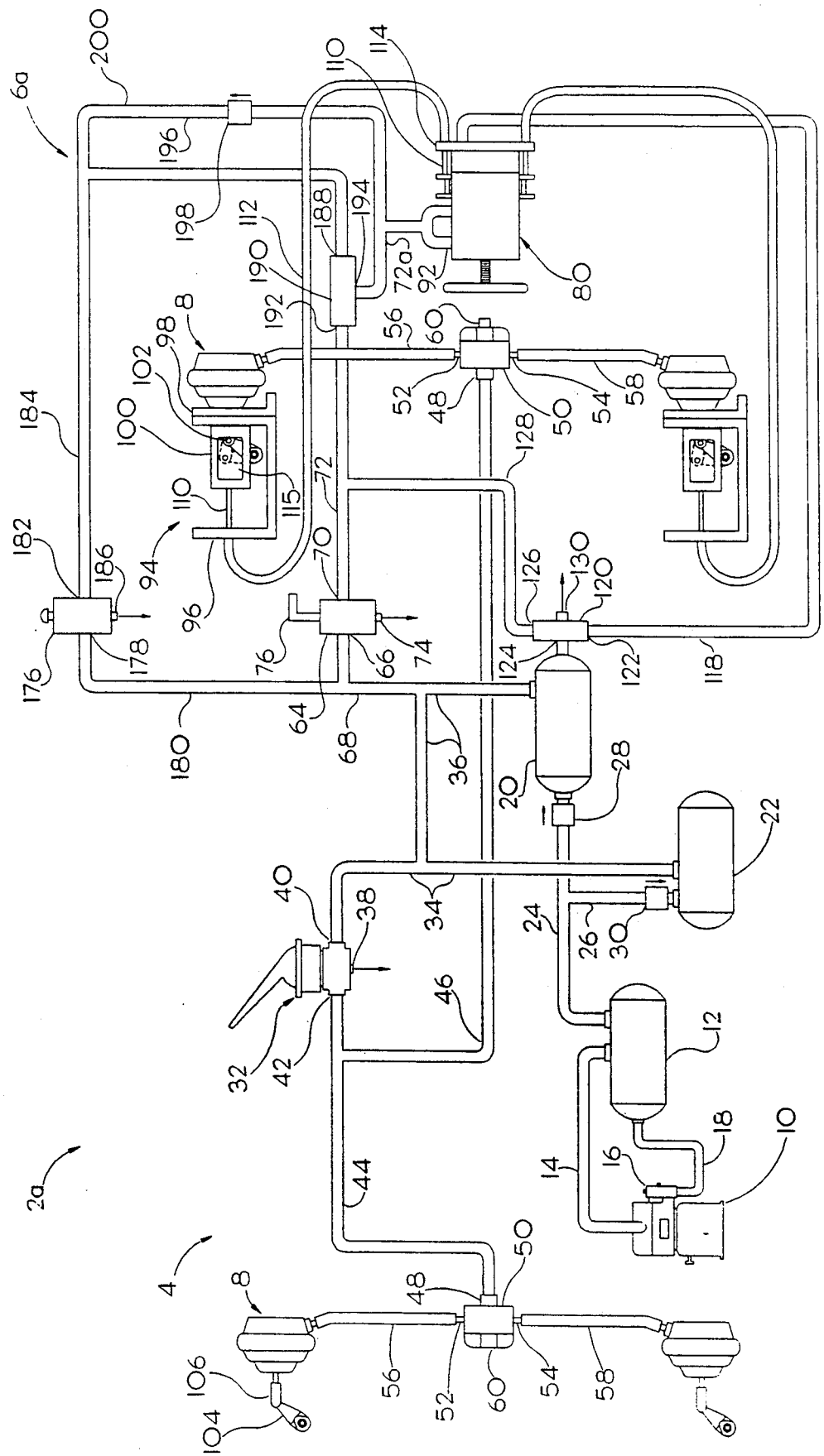
FIG. 4 is a schematic view of an alternative embodiment of the brake system of FIG. 1.

FIG. 4 illustrates an improved braking system 2a which uses E&P actuator 80 and also allows actuator 80 to exert two levels of force to accommodate the higher force needed during emergency situations and the lower force needed during parking. System 2a is very similar to system 2 with like reference numerals referring to like components. System 2a includes a parking brake control valve 176 having an inlet 178 connected to line 68 by a line 180, an outlet 182 connected to a line 184, and an exhaust 186 opening into atmosphere. As with conventional parking brake control valves, actuating valve 176 couples outlet 182 with exhaust 186 thus dumping any high pressure air in line 184 to atmosphere. The actuating valve 176 couples inlet 178 and outlet 182 thus pressurizing line 184. Line 184 connects to the control port 188 of a pilot control valve 190. Pilot control valve 190 has a inlet 192 and an outlet 194 positioned along line 72. Inlet 192 is connected to outlet 194 only when a high pressure is applied to control port 188; otherwise flow from inlet 192 to outlet 194 is prevented.

A bypass line 196 having a check valve 198 is connected to lines 184, 72a. Check valve 198 permits fluid flow along 196 from line 72a to line 184 but not the reverse. The operation of system 2a under various operating conditions will now be described.

During operation, tanks 12, 20 and 22 and lines 14, 18, 24, 26, 34, 36 and 68 are pressurized under all circumstances. When driving without any brakes, lines 44, 46, 56, 58 and 118 are at atmospheric pressure while the remaining lines are pressurized. Applying service brakes by activating pedal valve 32 causes all lines except for line 118 to be pressurized and thus moves slack adjusters 104 from the solid line position of FIG. 1 to the dotted line position of FIG. 1.

With the improved brake system 2a of FIG. 4, a parking brake level braking force level can be applied. To do so, parking brake control valve 176 is activated causing lines 184, 196, 72a, 118, 44, 46, 56, and 58 to be vented to atmosphere while the remaining lines are pressurized. This releases pressurized air from chambers 82a, 82b and allows chamber 86 to remain at atmospheric pressure. This condition of E&P actuator 80 is shown in FIG. 5. Thus, the force on cable 110 is due to the expanded spring 90.

To apply brakes in an emergency, during which a braking force higher than that available when parking is needed, modulated E&P brake control valve 64 is actuated to vent line 72 and 128. Since line 184 is pressurized, lines 72a is also vented to atmosphere. Note that check valve 198 keeps that portion 200 of line 196 between the check valve and line 184 at a high pressure value. Also, release exhaust valve 120, since control port 126 is at a low pressure level, couples inlet 124 with outlet 122 thus pressurizing line 118. This pressurization of chamber 86 and the depressurization of chambers 82a, 82b, shown in FIG. 6, causes compensation diaphragm assembly 88 to substantially recompress spring 90 over the partially extended condition of FIG. 4 thus creating an additional braking force for the emergency situation. It should be noted that since valve 64 is a modulated valve, line 72 can be partially and/or slowly vented to atmosphere to allow the gradual application of the brakes for better control.

Figure 7:
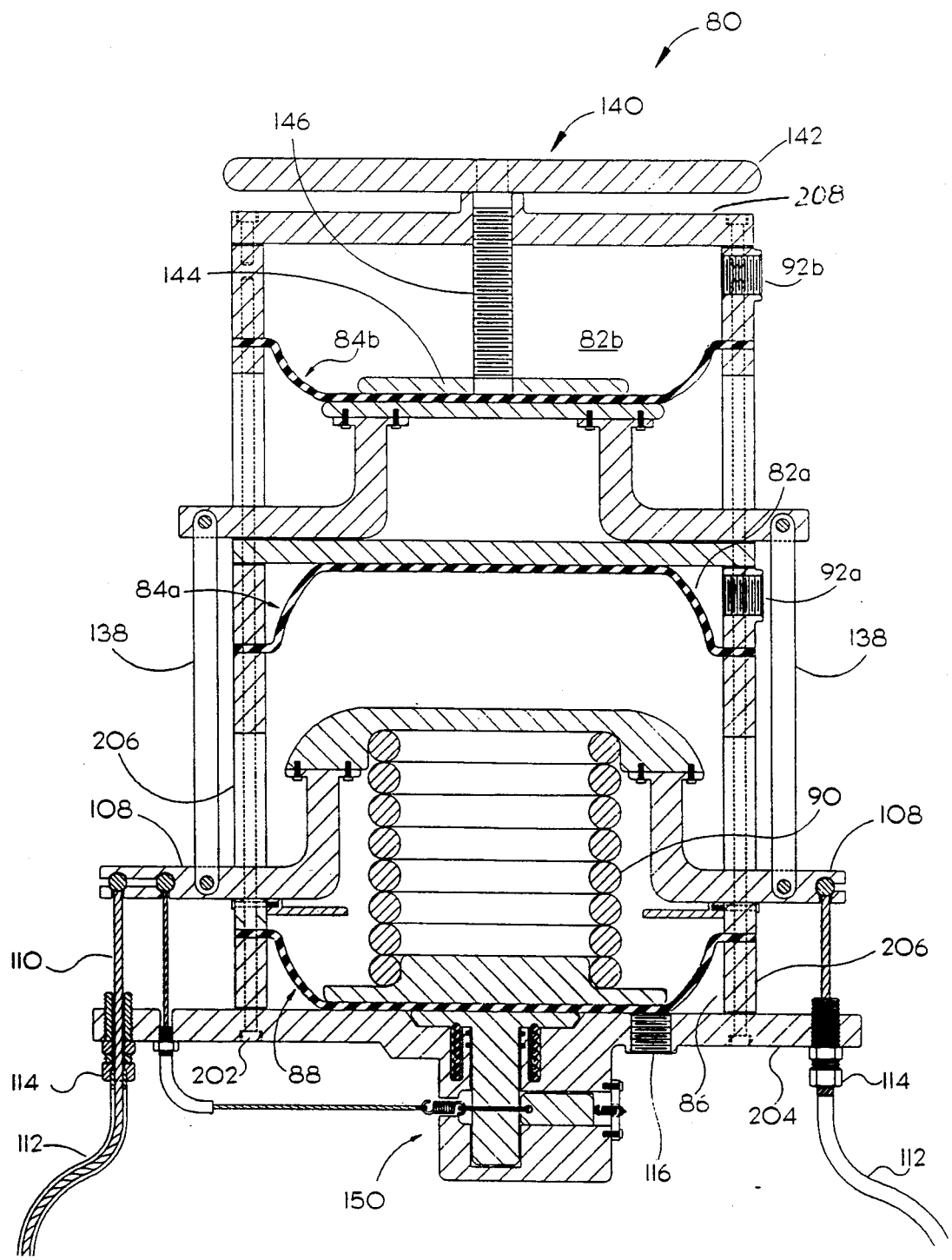
FIG. 7 shows the E&P actuator of FIG. 3A in the mechanically brakes released state through the operation of the manual release assembly.

At times it is necessary to deactivate E&P actuator 80. This is done using manual release assembly 140 as shown in FIG. 7. Turning wheel 142 causes plate 144 to press against diaphragm 84b thus driving links 138 against extensions 108 to compress spring 90 thus releasing the tension of cables 110. It is preferred that wheel 142 be removable so that the wheel can be stored in an easily accessible but protected place, typically within the cab of the vehicle. This not only prevents unauthorized tampering but also helps to keep wheel 142 from getting lost or damaged.

With actuator 80 in the mechanically released state of FIG. 7, actuator 80 can be safely disassembled without fear of injury due to compressed spring 90. This is achieved by turning off compressor 10, venting tanks 12, 20 and 22, placing actuator 80 in the mechanically released state of FIG. 7 and then disconnecting cables 110 from extensions 108. Wheel 142 is rotated until actuator 80, with the exception of cables 110, is in the state of FIG. 5. Socket head cap screws 202 (at least 3 are used) are loosened to permit base 204 to separate from sidewall 206. Cap screws 202 are sufficiently long so that spring 90 is fully extended before cap screws 202 disengage from sidewall 206. Alternatively, extra long nuts (not shown) having enlarged heads could be inserted into countersunk holes formed in the top plate 208 of actuator 80 and extending into sidewall 206 in line with cap screws 202. By making the extra long nuts long enough, cap screws 202 do not disengage from the nuts until spring 90 is fully expanded. Doing so also eliminates the need to thread the holes in sidewall 206 through which cap screws 202 pass.

Figure 8:
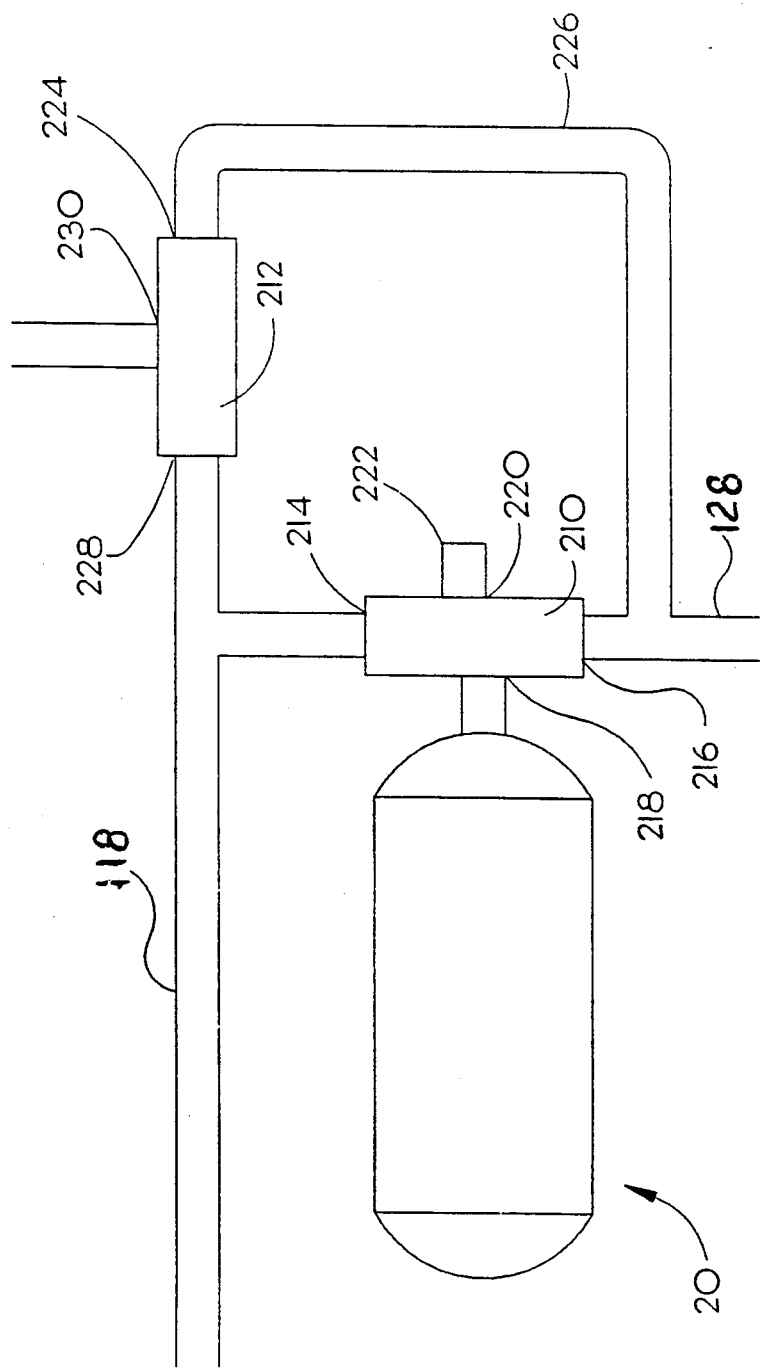
FIG. 8 illustrates a valve arrangement which can be used as an alternative to the relay exhaust valve of FIG. 1.

Release exhaust valve 120 could be replaced by other valving arrangements. For example, FIG. 8 shows the use of a conventional quick release valve 210 mounted in parallel with a pilot control valve 212. Quick release valve 210 has an exhaust port 214 connected to line 118 and a delivery port 216 connected to line 128. Chamber port 218 of valve 210 is connected to tank 20 while chamber port 220 is sealed by a plug 222. Pilot control valve 212 includes a control port 224 connected to line 128, and thus delivery port 216, by a line 226 while inlet port 228 of valve 212 is connected to line 118. Exhaust port 230 of pilot control valve 212 opens into the atmosphere. Therefore, when the pressure at ports 216, 224 is low, ports 214, 218 are coupled thus pressurizing line 118; when pressure at ports 216, 224 is high, ports 218, 214 are fluidly isolated and line 118 is exhausted to atmosphere through exhaust port 230.

As discussed above, it is desirable that system 2a of FIG. 4 apply the lower, parking brake force through depressurization of both spring brake chambers 84a, 84b and compensation chamber 86 as illustrated in FIG. 5. However, after a vehicle has been parked for an extended period of time, high pressure in line 72 may slowly be reduced through imperfect seals or fittings. If this occurs, and assuming tank 20 is still pressurized, valve 120, with control port 126 at a low pressure, will couple outlet 122 to inlet 124 so to pressurize line 118 and thus compensation chamber 86. This can result in an increased braking force being applied to the brakes, an undesirable situation. To compensate for this possible problem, base 204 can be supplied with a small bleed hole which slowly allows high pressure within chamber 86 to bleed out to the ambient environment after, for example, 5 or 10 minutes. Since emergency situations are quite brief, such a pressure reduction technique should not affect emergency braking force to any discernable degree.

Figure 9:
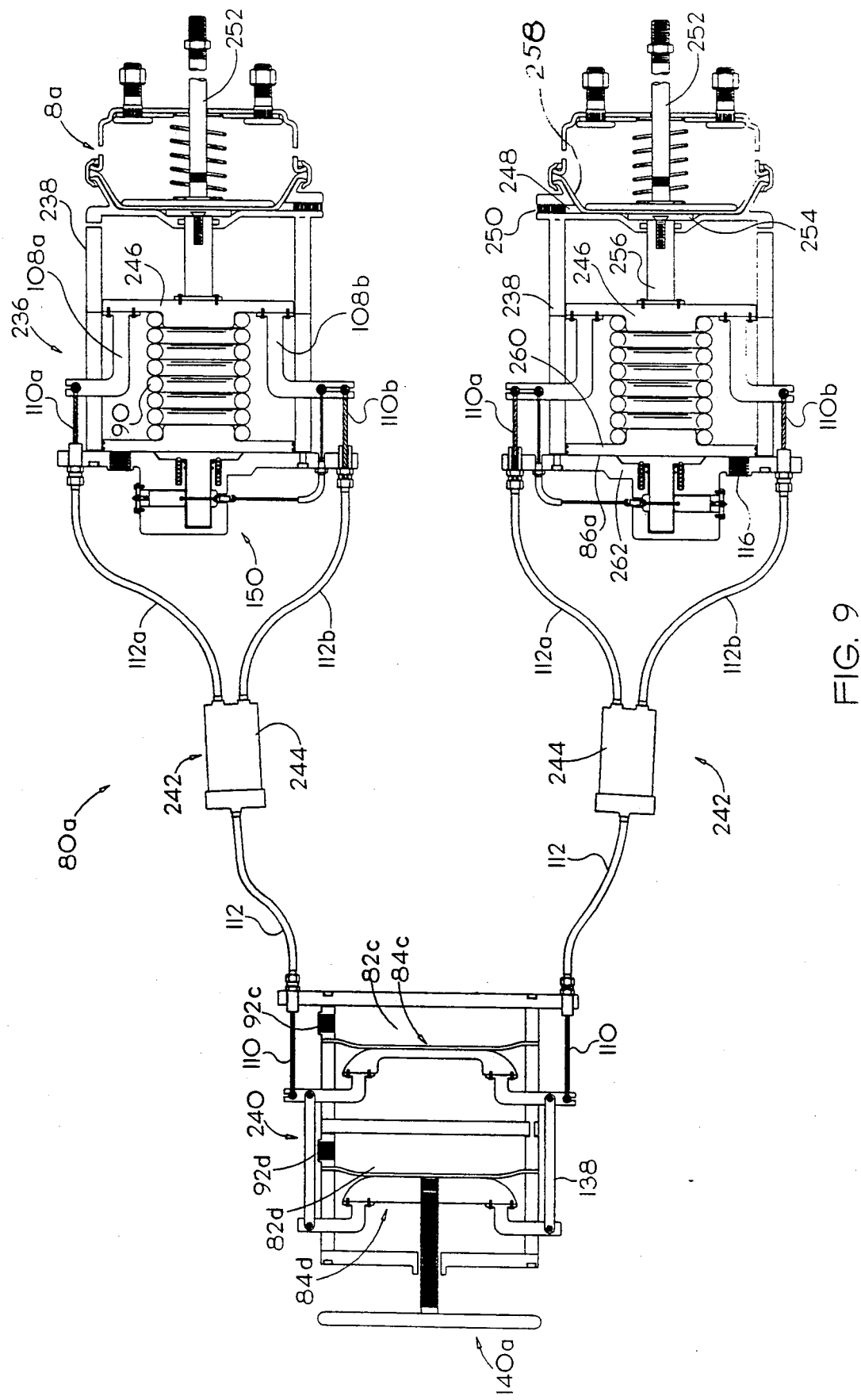
FIG. 9 illustrates an alternative embodiment of the E&P actuator of FIG. 1.
Figure 10:
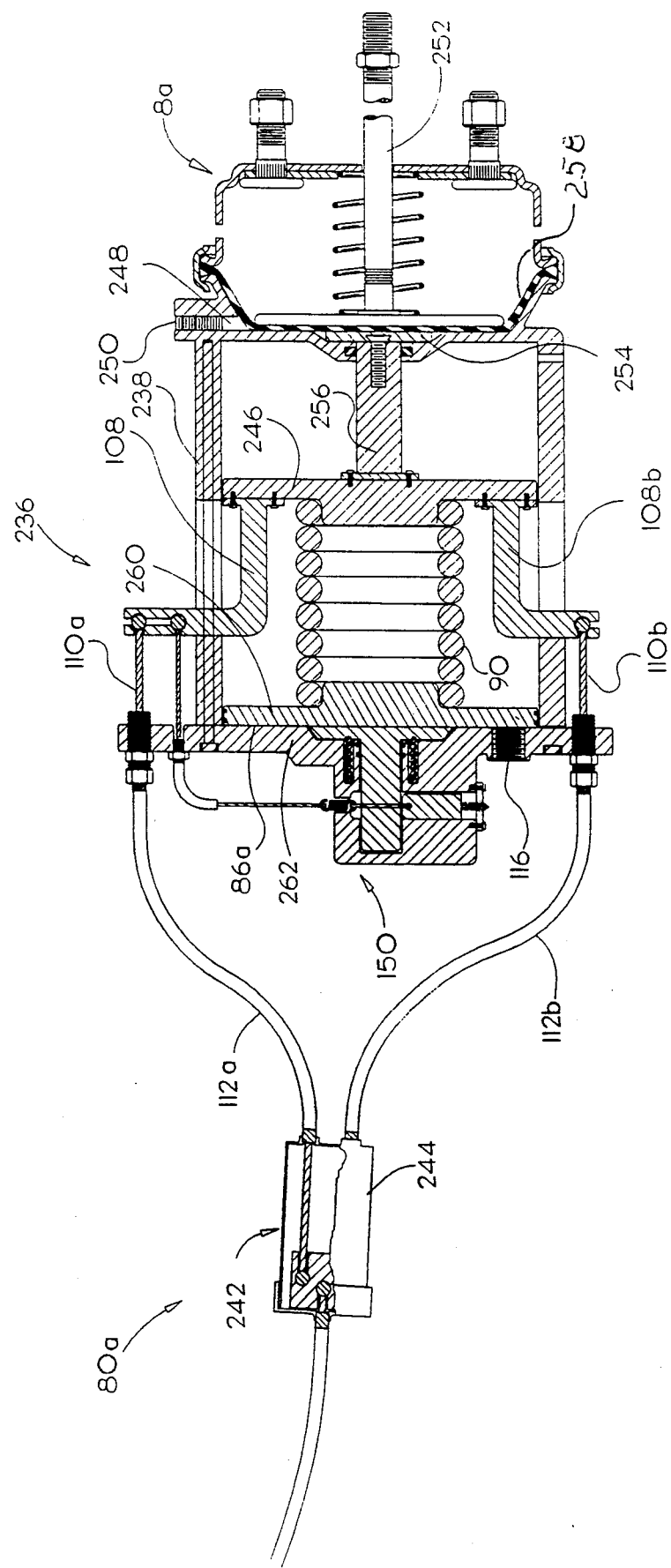
FIG. 10 is an enlarged view of the top right-hand portion of FIG. 9.
Figure 11:
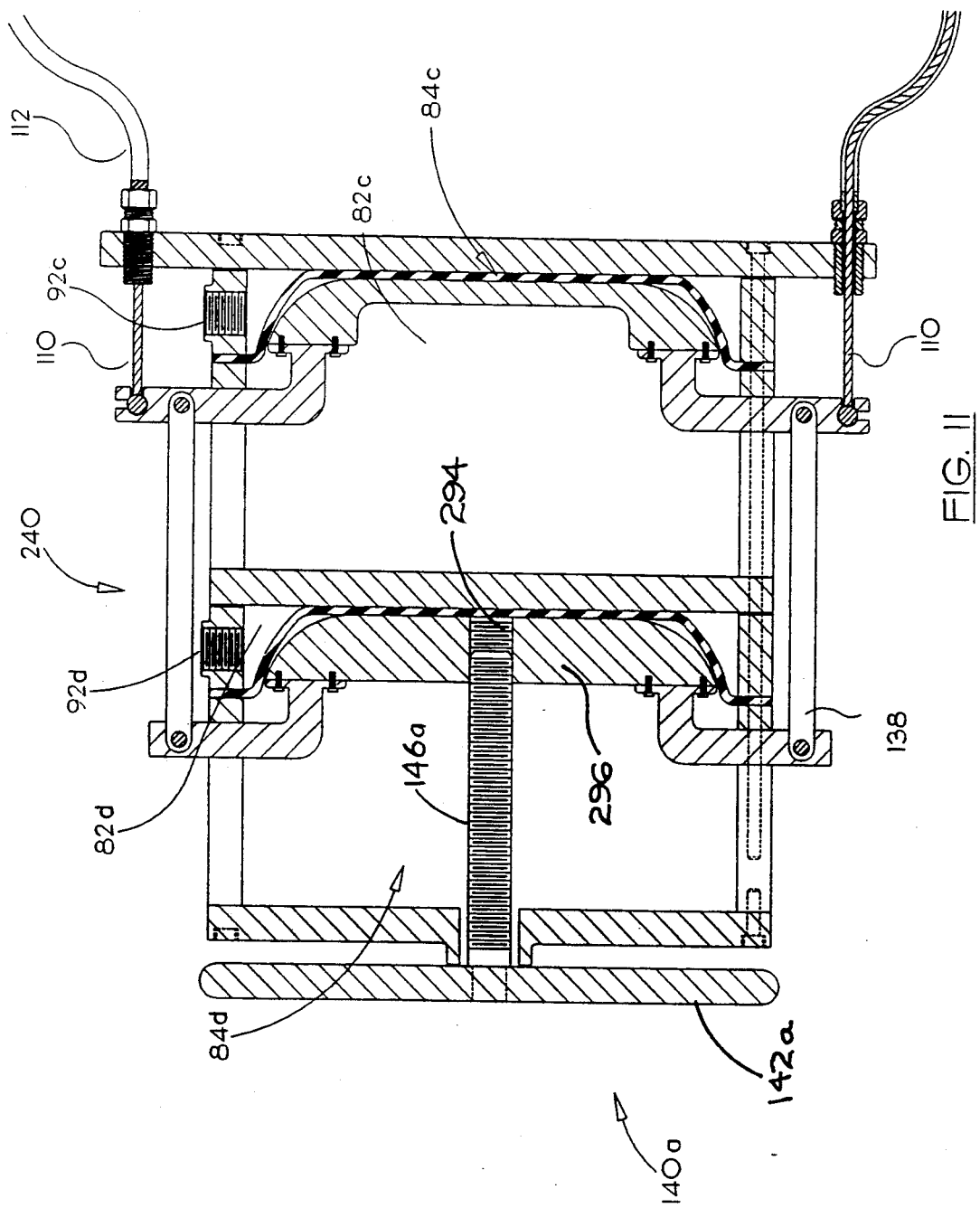
FIG. 11 is an enlarged view of the left-hand side of FIG. 9.

FIGS. 9-11 illustrate a further embodiment of an E&P actuator used with a generally conventional service brake 8a. E&P actuator 80a is similar to actuator 80 with like reference numerals referring to like elements. The main distinction is that E&P actuator 80a is split into two portions, a spring portion 236 having a frame 238 made as an integral part of brake 8a, and a chamber portion 240 coupled to the spring portion by cable assemblies 242. Cable assemblies 242 each include a cable Y-connector 244 which couples cables 110 to cables 110a, 110b. Cables 110a, 110b pull on compensator plate 246 when chambers 82c and 82d are pressurized as in FIG. 9 thus compressing spring 90 so as not to apply the brakes. Pressurizing service brake chamber 248 through port 250 while maintaining chambers 82c, 82d pressurized causes push rod 252 to move to the right in FIG. 9 thus applying the brakes without the aid of any additional braking force caused by spring 90. Evacuation of chambers 82c, 82d allows cable assemblies 242 to permit compensator plate 246 to move to the right in FIG. 9 thus forcing end 254 of a compensation plate extension 256 against service brake diaphragm 258 so to apply an additional braking force to push rod 252 and apply parking and emergency brakes.

To help compensate for the biasing force lost when spring 90 has expanded, E&P brake system 80a uses a compensating piston 260 instead of the compensating diaphragm assembly 88 of FIG. 3A. When pressurized air is directed to port 116 into the compensating chamber 86a defined between back plate 262 of frame 238 and piston 260, piston 260 recompresses spring 90 much as occurs in the embodiment of FIG. 6. Likewise, lock pin assembly 150 in the embodiment of FIG. 9 operates in substantially the same manner as in the embodiment of FIGS. 3A-3C. The embodiment of FIGS. 9-11 is thus seen to eliminate the need for structure which engages the slack adjustor. It does, however, continue to permit the provision of both the lower level parking brake force, with compensation chamber 86a bent to atmosphere and a higher pressure emergency braking force with compensation chamber 86a pressurized.

To manually release the brakes, manual release wheel 142a is rotated to thread shaft 146a into and through a threaded hole 294 in plate 296 so to pull plate 296 and links 138 therewith to the left in FIG. 11. This pulls on cables 110 to compress spring 90 to permit the brakes to be released.

Figure 12:
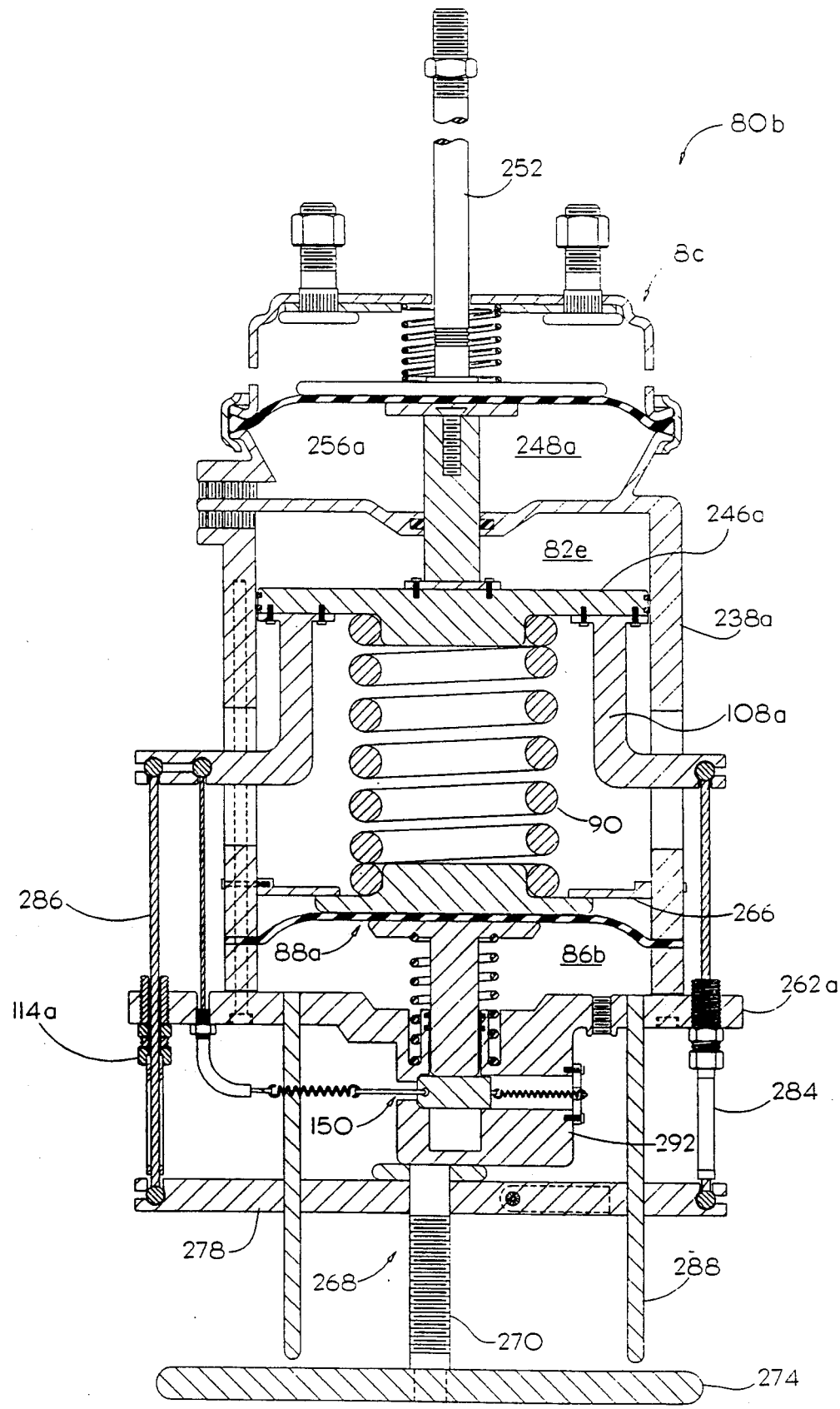
FIG. 12 is a further embodiment of an E&P actuator made according to the invention.
Figure 13:
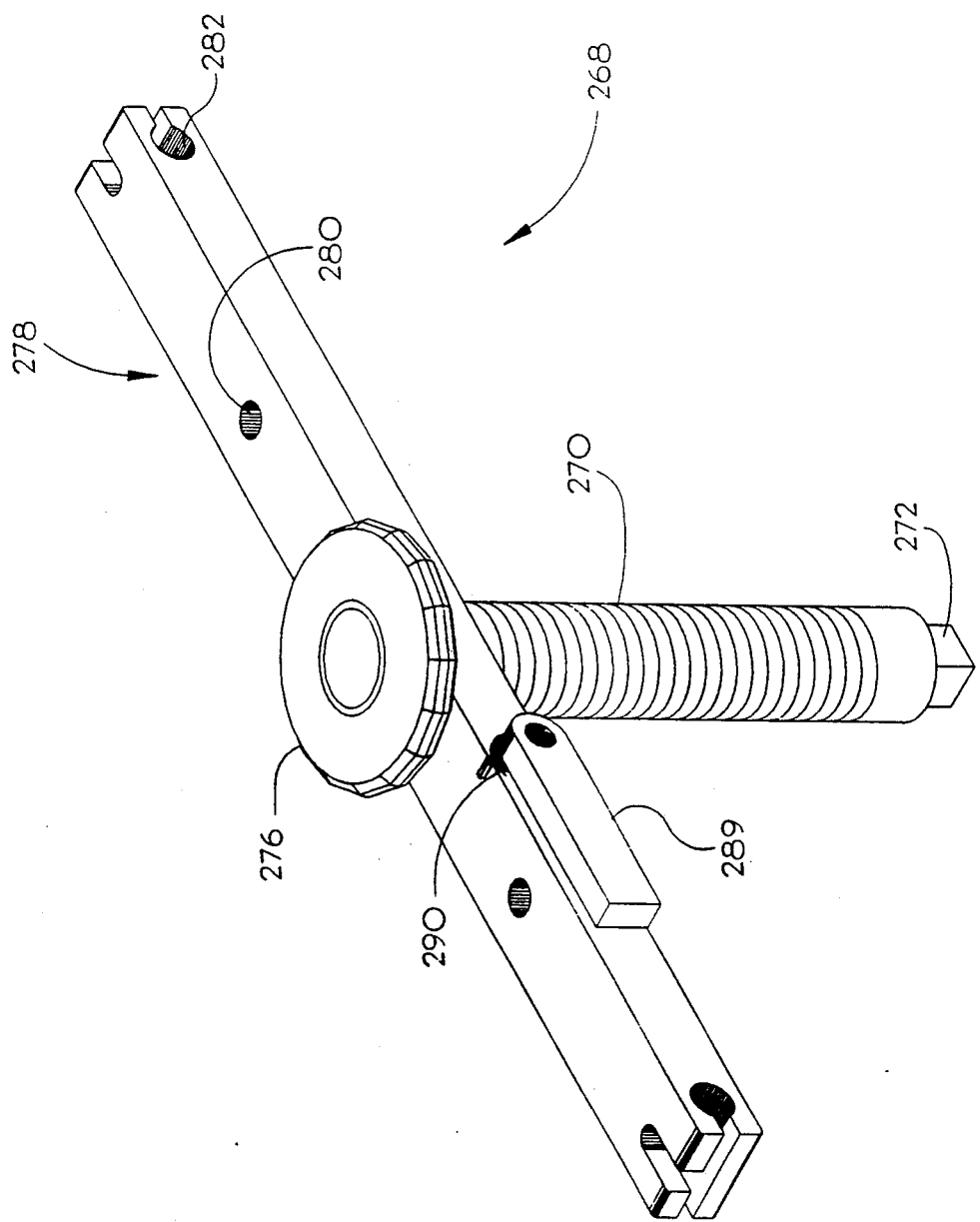
FIG. 13 is an isometric view of the manual release bar assembly shown in FIG. 12.

FIGS. 12 and 13 illustrate a further embodiment of the invention similar to the embodiment of FIGS. 9-11 but in which the spring and chamber portions 236, 240 of E&P actuator 80a have been combined together into a single unit mechanically connected to service brake 8b. Once again, like elements are referred to using like reference numerals and thus the elements will not be described again. E&P actuator 80b is shown with spring brake chamber 82e and compensation chamber 86b pressurized during an emergency braking situation in which spring 90 is applying the brakes through the push rod 252, the deflection of spring 90 being partially compensated by the pressurization of compensation chamber 86b with resulting movement of compensation diaphragm assembly 88a. Note that the movement of diaphragm assembly 88a is limited by an annular stop block 266. The pressurizing of chamber 86b and repressurizing chamber 82e will cause E&P actuator 80b to assume the position shown in FIG. 9 so that operation of push rod 252 is determined by the pressurization of service brake chamber 248a.

As with the earlier embodiments, E&P actuator 80b provides for at least the partial recompression of spring 90 when the spring has been actuated to apply the brakes. Doing so permits a higher braking force to be applied during emergency situations than needs be applied during parking situations. E&P actuator 80b is primarily different in the means by which the emergency and parking brakes can be manually released. Assembly 80b includes a manual release bar assembly 268 including a threaded shaft 270 having a square drive peg 272 at one end, onto which a release wheel 274 can be mounted, and a thrust washer 276 rotatably mounted to the opposite end of shaft 270. Assembly 268 also includes a manual release bar 278 having two guide holes 280 formed along its length and a cable end catch slot 282 at either end. Bar 278 is threadably mounted to shaft 270. Assembly 268 is secured to back plate 262a by a pair of coaxial cables 284 having inner cables 286 secured at their ends to catch spots 282 and extensions 108a. A pair of guide pins 288 extend from back plate 262a and pass through guide holes 280 so to prevent bar 278 from rotating about the axis of shaft 270 as shaft 270 is rotated by turning wheel 274. For right-hand threads, rotating release wheel 274 clockwise will cause bar 278 to move away from spring 90, that is downwardly in FIG. 12. This causes inner cables 286 to pull on extensions 108a thus forcing compensator plate 246a against spring 90 and simultaneously pulling compensation plate extension 256a away from push rod 252 to release the brakes. Once spring 90 is compressed, latch arm 289, which is pivotably mounted to manual release bar 278, is pivoted towards lock pin assembly 150. Since latch arm 289 is biased towards the retracted position of FIG. 13 by the torsion spring 290, wheel 274 is rotated counterclockwise to force the outer end of latch arm 289 against the base 292 of lock pin assembly 150.

Other modifications and variations can be made to the disclosed embodiments without departing from the subject of the invention as defined in the following claims. For example, instead of diaphragm assemblies 84, 88, pistons, such as piston 260, can be used as well. The invention is shown using a single E&P actuator 80 for two brake actuators 8. One or more E&P actuator 80 could be used for a greater or lesser number of brake actuators 8 if desired. Also, all the vehicle's brakes could be coupled to an E&P actuator 80.

A variety of other methods for coupling cable 110 to slack adjuster 104 could be used. For example, cable 110 could be passed loosely through a hole formed in pin 102, pin 102 being rotatable about its own axis. With the end of cable 110 enlarged, so as not to pass back through the hole, slack adjuster 104 could be free to pivot back and forth between brakes applied and brakes off positions. Only upon actuation of E&P actuator 80 would cable 110 be pulled taut to force actuator to its brake applied position, thus applying the brakes.

The present invention is adapted for use with the existing, conventional slack adjusters. The invention could of course be used with specially constructed brake actuator elements as well. Also, E&P actuator 80 could be hydraulically instead of pneumatically powered with appropriate changes in the controls and lines.

What is claimed is:

1. An emergency and parking brake system, for use with a brake system of the type including a brake, a source of braking energy coupled to a brake actuator, the brake actuator including a movable brake actuator element coupled to the brake and movable between brake released and brake applied positions, the emergency and parking brake system comprising:

an E&P actuator located physically distant from the brake actuator;

the E&P actuator including a variable volume spring brake chamber, defined in part by a spring brake chamber element movable between first and second positions, a variable volume spring deflection compensation chamber, defined in part by a movable compensation chamber element, and a compression spring positioned between the spring brake chamber element and the compensation chamber element;

applying means, coupling the spring brake chamber element to the brake actuator element, for applying a braking force to the brake actuator element when the spring brake chamber element is in the second position;

means for selectively pressurizing the spring brake chamber to force the spring brake chamber element towards the first position against the spring;

means for selectively depressurizing the spring brake chamber so the spring tends to expand and force the spring brake chamber element towards the second position; and means for selectively pressurizing the compensation chamber so that when the spring brake chamber is at least partially depressurized and the spring brake element has moved towards the second position, the compensation chamber element tends to recompress the spring thereby increasing the force exerted on the spring brake chamber element by the spring.

2. The system of claim 1 wherein the applying means includes a cable and the E&P actuator includes a cable puller.

3. The system of claim 1 wherein the spring brake chamber and the compensation chamber are pressurized using air.

4. The system of claim 1 wherein the spring brake chamber element includes a movable diaphragm.

5. The system of claim 1 wherein the spring brake chamber element includes a piston.

6. The system of claim 1 wherein the selectively depressurizing means includes a modulated pressure control valve to permit the user to adjust the degree of depressurization of the spring brake chamber.

7. The system of claim 1 further comprising manual means for keeping the spring brake chamber element in the first position regardless of the level of pressurization of the spring brake chamber.

8. The system of claim 7 wherein the manual keeping means includes a manual release wheel and a manual release plate connected by a threaded shaft.

9. An emergency and parking brake system, for use with a brake system of the type including a brake, a source of braking energy coupled to a brake actuator, the brake actuator including a movable brake actuator element coupled to the brake and movable between brake released and brake applied positions, the emergency and parking brake system comprising:

an E&P actuator located physically distant from the brake actuator;

the E&P actuator including a pressurizable, variable volume spring brake chamber, defined in part by a spring brake chamber element movable between first and second positions, a pressurizable, variable volume spring deflection compensation chamber, defined in part by a movable compensation chamber element, and a compression spring positioned between the spring brake chamber element and the compensation chamber element; and applying means, coupling the spring brake chamber element to the brake actuator element, for applying a braking force to the brake actuator element when the spring brake chamber is depressurized so the spring brake chamber element is in the second position;

whereby when the spring brake chamber is depressurized:

a) a higher level of force is exerted on the brake actuator element by the applying means when the compensation chamber is pressurized; and b) a lower level of force is exerted on the brake actuator element by the applying means when the compensation chamber is depressurized.

10. An emergency and parking brake system, for use with an air brake system of the type including a brake, a pressurized air source coupled to a service brake actuator, the service brake actuator including a movable slack adjuster coupled to the brake and movable between brake released and brake applied positions, the emergency and parking brake system comprising:

an E&P actuator located physically distant from the service brake actuator;

the E&P actuator including a pressurizable, variable volume spring brake chamber, defined in part by a spring brake diaphragm assembly movable between first and second positions, a pressurizable, variable volume spring deflection compensation chamber, defined in part by a movable compensation diaphragm assembly, and a compression spring positioned between the spring brake diaphragm assembly and the compensation diaphragm assembly; and cable means, coupling the spring brake diaphragm assembly to the slack adjuster by a cable, for pulling and thus applying a braking force to the slack adjuster when the spring brake chamber is depressurized so the spring brake diaphragm assembly is in the second position;

whereby when the spring brake chamber is depressurized:

a) a higher level of force is exerted on the slack adjuster by the cable means when the compensation chamber is pressurized; and b) a lower level of force is exerted on the slack adjuster by the cable means when the compensation chamber is depressurized.

11. An emergency and parking brake system, for use with a brake system of the type including a brake, a source of braking energy coupled to a brake actuator, the brake actuator including a movable brake actuator element coupled to the brake and movable between brake released and brake applied positions, the emergency and parking brake system comprising:

a spring brake portion including a variable volume spring brake chamber, the spring brake chamber located physically distant from the brake actuator and including a movable spring brake chamber element, a spring, means for physically connecting the spring to the brake actuator element, and means for physically connecting the spring brake chamber element to the spring so that pressurization of the spring brake chamber tends to reduce any force applied to the brake actuator element by the spring and depressurization of the spring brake chamber tends to allow the spring to deflect and apply a force to the brake actuator element; and means for compensating for any reduction of force applied by the spring when the spring brake chamber is depressurized by at least partially redeflecting the spring to increase the force of the spring applied to the brake actuator element.

12. The system of claim 11 wherein the spring is a compression spring.

13. An emergency and parking brake system, for use with a brake system of the type including a brake, a source of braking energy coupled to a brake actuator, the brake actuator including a movable brake actuator element coupled to the brake and movable between brake released and brake applied positions, the emergency and parking brake system comprising:

a spring brake portion including a variable volume spring brake chamber, the spring brake chamber including a movable spring brake chamber element, a spring, and means for physically connecting the spring to the brake actuator element, and means for physically connecting the spring brake chamber element to the spring so that pressurization of the spring brake chamber tends to reduce any force applied to the brake actuator element by the spring and depressurization of the spring brake chamber tends to allow the spring to deflect and apply a force to the brake actuator element; and means for compensating for any reduction of force applied by the spring when the spring brake chamber is depressurized by at least partially redeflecting the spring to increase the force of the spring applied to the brake actuator element.

* * * * *